Jan. 4, 1966 D. W. HAGELBARGER 3,227,999

CONTINUOUS DIGITAL ERROR-CORRECTING SYSTEM

Filed June 15, 1962 8 Sheets-Sheet 1

CONTINUOUS DIGITAL ERROR-CORRECTING SYSTEM
Filed June 15, 1962
FIG. 3A
DECODING CHECK SETS FOR I7
| | | | | |
|---|---|---|---|---|
| I7 | I5 | I2 | I1 | C1 |
| I9 | I7 | I4 | I3 | C3 |
| I12 | I10 | I7 | I6 | C6 |
| I13 | I11 | I8 | I7 | C7 |
FIG. 3B
| | | | |
|---|---|---|---|
| I7 | I7−S1 | I7−S1−S2 | I7−S1−S2−S3 |
| I7+S1 | I7 | I7−S2 | I7−S2−S3 |
| I7+S1+S2 | I7+S2 | I7 | I7−S3 |
| I7+S1+S2+S3 | I7+S2+S3 | I7+S3 | I7 |
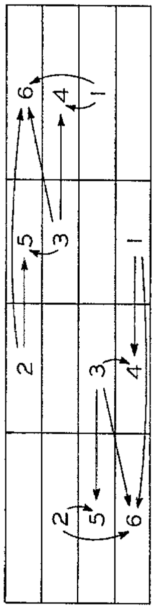
FIG. 3C
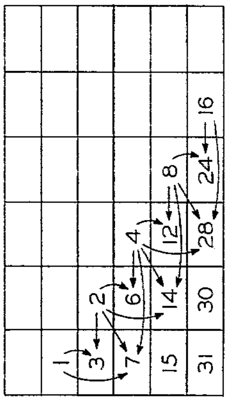
FIG. 4
FIG. 5A
| | | | | | |
|---|---|---|---|---|---|
| | | | | | |
| 1 | | | | | |
| 3 | 2 | | | | |
| 7 | 6 | 4 | | | |
| 12 | 11 | 9 | 5 | | |
| 20 | 19 | 17 | 13 | 8 | |
FIG. 5B
| | | | | | | |
|---|---|---|---|---|---|---|
| I21 | I20 | I18 | I14 | I9 | I1 | C1 |
| I22 | I21 | I19 | I15 | I10 | I2 | C2 |
| I24 | I23 | I21 | I17 | I12 | I4 | C4 |
| I28 | I27 | I25 | I21 | I16 | I8 | C8 |
| I33 | I32 | I30 | I26 | I21 | I13 | C13 |
| I41 | I40 | I38 | I34 | I29 | I21 | C21 |

Jan. 4, 1966 D. W. HAGELBARGER 3,227,999

CONTINUOUS DIGITAL ERROR-CORRECTING SYSTEM

Filed June 15, 1962 8 Sheets-Sheet 7

FIG. 11

| ROW NO. | | | | | | | | | | | | | |
|---|---|---|---|---|---|---|---|---|---|---|---|---|---|
| 1 | J21 | J19 | J11 | J7 | K23 | K18 | K12 | K5 | L25 | L22 | L6 | L5 | C5 |
| 2 | J23 | J21 | J13 | J9 | K25 | K20 | K14 | K7 | L27 | L24 | L8 | L7 | C7 |
| 3 | J31 | J29 | J21 | J17 | K33 | K28 | K22 | K15 | L35 | L32 | L16 | L15 | C15 |
| 4 | J35 | J33 | J25 | J21 | K37 | K32 | K26 | K19 | L39 | L36 | L20 | L19 | C19 |
| | | | | | | | | | | | | | |
| 5 | J19 | J17 | J9 | J5 | K21 | K16 | K10 | K3 | L23 | L20 | L4 | L3 | C3 |
| 6 | J24 | J22 | J14 | J10 | K26 | K21 | K15 | K8 | L28 | L25 | L9 | L8 | C8 |
| 7 | J30 | J28 | J20 | J16 | K32 | K27 | K21 | K14 | L34 | L31 | L15 | L14 | C14 |
| 8 | J37 | J35 | J27 | J23 | K39 | K34 | K28 | K21 | L41 | L38 | L22 | L21 | C21 |
| | | | | | | | | | | | | | |
| 9 | J17 | J15 | J7 | J3 | K19 | K14 | K8 | K1 | L21 | L18 | L2 | L1 | C1 |
| 10 | J20 | J18 | J10 | J6 | K22 | K17 | K11 | K4 | L24 | L21 | L5 | L4 | C4 |
| 11 | J36 | J34 | J26 | J22 | K38 | K33 | K27 | K20 | L40 | L37 | L21 | L20 | C20 |
| 12 | J37 | J35 | J27 | J23 | K39 | K34 | K28 | K21 | L41 | L38 | L22 | L21 | C21 |

FIG. 12A

| | | | |
|---|---|---|---|
| 2 | | | |
| 10 | 8 | | |
| 14 | 12 | 4 | |

FIG. 12B

| | | | |
|---|---|---|---|
| 5 | | | |
| 11 | 6 | | |
| 18 | 13 | 7 | |

FIG. 12C

| | | | |
|---|---|---|---|
| 3 | | | |
| 19 | 16 | | |
| 20 | 17 | 1 | |

United States Patent Office 3,227,999
Patented Jan. 4, 1966

3,227,999

CONTINUOUS DIGITAL ERROR-CORRECTING SYSTEM

David W. Hagelbarger, Morris Township, Morris County, N.J., assignor to Bell Telephone Laboratories, Incorporated, New York, N.Y., a corporation of New York Filed June 15, 1962, Ser. No. 202,756
12 Claims. (Cl. 340—146.1)

This invention relates to digital information processing systems, and more particularly to the automatic correction of errors in such systems.

The problem of correctly transmitting binary signals over a noisy channel is a significant one whose solution has been actively sought. Some illustrative situations in which this problem arises are: when telephone lines subject to error impulses are being used to transmit data in binary form; when an imperfect medium such as magnetic tape or a photographic emulsion is used to store binary data; or when operations on binary signals are being carried out by means of circuits constructed of devices such as relays, diodes, or transistors, which have a probability of error.

By the use of redundancy, it is possible to encode a message for transmission in such a way that a decoder is able to extract the original information content from the redundant message despite the fact that the message may have been mutilated during transmission.

A number of redundant error-correcting systems have embodied therein a parity check digit concept. A parity check digit is a digit added to a group of binary information digits to make the sum of the information and check digits always odd (or even) in accordance with a predetermined decision. Illustrative of the error-correcting systems which employ parity checks as the basis for identifying erroneous digits therein are those disclosed in R. W. Hamming-B. D. Holbrook, Reissue Patent 23,601, issued December 23, 1952 and, also, those disclosed in my Patent 2,956,124, issued October 11, 1960.

The systems to which my above-cited patent are directed are primarily applicable to communication channels on which errors are not independent but tend instead to occur in groups. For example, a lightning stroke may knock out several adjacent telegraph pulses. These groups of errors are called "bursts." The recurrent burst-correcting codes embodied in those systems can be implemented with considerably less equipment than was needed for mechanizing previously known error-correcting codes having similar capabilities.

On some communication channels, however, the errors which occur are in fact statistically independent. That is, each digit propagated along such a channel has the same error probability independent of all other propagated digits. To correct such independently-occurring errors in an efficient manner requires that the systems disclosed in my aforecited patent be modified in a novel manner to give them unique and unobvious error-correcting capabilities.

It is, accordingly, an object of the present invention to improve information processing systems.

More specifically, it is an object of this invention to provide an improved error-correcting system.

Another object of the present invention is the efficient correction of statistically independent errors.

Yet another object of this invention is to provide relatively simple and reliable systems for automatically correcting independently-occurring errors.

These and other objects of the present invention are realized in a specific illustrative system embodiment thereof that includes an encoder and a decoder interconnected by a noisy communication channel. The encoder includes a shift register to the input stage of which are applied binary information digits, the output stage of the register being connected via a switching circuit to the channel. In addition, the encoder includes a parity check digit generating circuit whose output is also connected to the channel via the switching circuit. Input signals are applied to the generating circuit from selected ones of the stages of the register, whereby a predetermined parity relationship is established by the generating circuit between the information digits stored in the selected stages and the check digit generated by the parity circuit. Each check digit and the associated information digits determinative thereof are known as a "check set."

In particular, the selection of inputs to the parity check digit generating circuit included in the encoder is made such that when all the check sets including a common information digit are regarded as a group, no digit other than the common digit is common to two or more check sets thereof. Such a group of check sets will be referred to herein as possessing the property of independence.

At the decoder the redundant information message is processed to determine whether the information digit common to each group of check sets is correct or not. The indications available for this determination are the value of the common digit itself and the respective values obtained by recalculating those check sets which include the common digit. If more than half of the check sets including the common digit indicate an incorrect parity relationship, then the value of the common digit is reversed by the decoding circuitry. If, on the other hand, half or less of the check sets indicate an incorrect parity relationship, the value of the common digit is left undisturbed.

In this manner the decoder of an illustrative embodiment of the principles of the present invention automatically corrects for the occurrence on the channel of erroneous digits. In particular, one specific illustrative decoder made in accordance with the principles of the present invention can correct a maximum of any $S/2$ errors in the digits included in each group of independent check sets, S being any even positive integer greater than two.

It is, therefore, a feature of the present invention that the encoder of an error-correcting system include a parity generating circuit for forming check digits each of which is a member of a group of independent check sets.

It is a further feature of this invention that the encoder of such a system include a multistage shift register to whose input stage information digits are applied, that the encoder also include a parity generating circuit whose inputs are derived from S selected stages of the register so as to generate check digits each of which that is derived from a common information digit is a member of a group of S independent check sets, and that a switching circuit be connected to the output stage of the register and to the output of the parity generating circuit for interleaving the information and check digits and applying them to a communication channel.

It is another feature of the present invention that the decoder of an error-correcting system include circuitry for determining whether the parity relationship embodied in each check set of a group of independent check sets is correct.

It is still another feature of this invention that the decoder of such a system further include circuitry for reversing the value of the information digit common to the group of independent check sets if more than half of the parity relationships embodied in the check sets are found to be in error.

A complete understanding of the present invention and of the above and other features and advantages thereof may be gained from a consideration of the following detailed description of an illustrative embodiment thereof presented hereinbelow in connection with the accompanying drawing, in which:

FIG. 3A shows in tabular form all the check sets which include information digit I7;

FIG. 3B is a modified form of the FIG. 3A table;

FIG. 3C is a numeric representation of the pattern according to which the digits included in the FIG. 3A table are formed;

FIGS. 4 and 5A are numeric representations of other patterns according to which systems made in accordance with the principles of the present invention may be constructed;

FIG. 5B is derived from the representation of FIG. 5A and is a particular listing of all the check sets which include a particular information digit;

FIG. 11 illustrates a check set pattern representative of the encoder and decoder shown in FIGS. 9 and 10; and FIGS. 12A, 12B, and 12C are numeric arrays according to which the FIG. 11 pattern was constructed.

Figure 1:
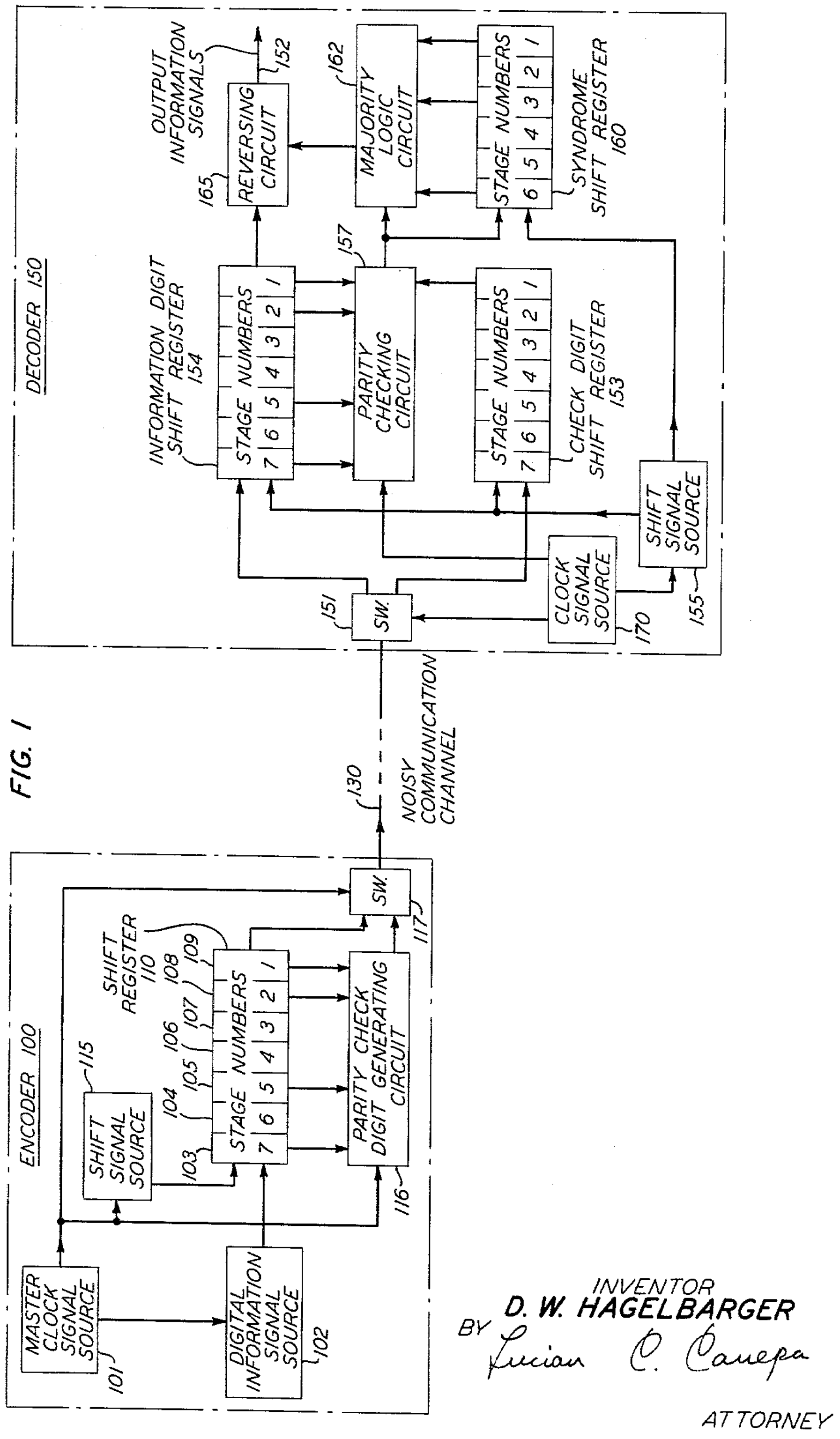
FIG. 1 depicts a specific illustrative information processing system made in accordance with the principles of the present invention.

The specific illustrative system shown in FIG. 1 includes an encoder 100 connected to a decoder 150 by a communication channel 130 which is susceptible to certain types of errors. For each binary digit propogated along the error-prone or noisy channel 130, there is a probability of an error occurring therein. The characteristics of the channel are assumed to be such that no digits are lost from or added to the digits applied to the channel. Instead, the only type of error that can occur is that which changes the value of a digit. In addition, each digit is assumed to have the same error probability independent of all other digits. In other words, the errors are statistically independent rather than tending to occur as bursts or groups of dependent errors.

In the illustrative system shown in FIG. 1, information signals are supplied by a source 102 and are then encoded into redundant form in the encoder 100 in accordance with the principles set forth in detail later hereinbelow. Subsequently, the encoded message including information and check signals is transferred via the channel 130 to the decoder 150 wherein the information signals are abstracted from the redundant message and then delivered to an output line 152. In accordance with the principles of this invention the probability of an error existing in the information signals delivered to the line 152 is significantly lower than the error probability that is characteristic of the channel 130.

The digital source 102 shown in FIG. 1 applies information signals in sequence under the control of a master clock signal source 101 to the input stage 103 of an encoding shift register 110. The information signals applied to the register 110 are shifted therethrough in a digit-by-digit manner under the control of signals from a shift source 115. When each stage of the register 110 has an information signal stored therein, a parity circuit 116 is triggered by a signal from the master source 101 to generate a check digit which, illustratively, establishes an even parity relationship (even number of "1's") among itself and the respective information signals stored in stages 103, 105, 108, and 109 of the register 110. Thereafter a parity check signal is generated by the circuit 116 after each shift of information signals through the register 110. The generated check degit signals and the shifted information digit signals are applied to a switch 117 which supplies the check and information signals in an interleaved manner to the channel 130.

More specifically, for each shift of the register 110 there is generated by the circuit 116 a check digit so that the parity (number of "1's") of the check digit and the information digits in stages 103, 105, 108, and 109 of the register 110 is even (zero, two or four). This check digit is transferred via the switch 117 to the channel 130 before the information digit stored in the last or output stage 109 is so transferred. Then a shift is made. The information digit which was in stage 109 is transferred to the channel and a new check digit is calculated. During each basic time interval of the complete cycle of operation of the illustrative encoder shown in FIG. 1, one new information digit signal is applied to the register 110 from the source 102 and two signals, one information, one check, are transferred to the channel.

Figure 2:
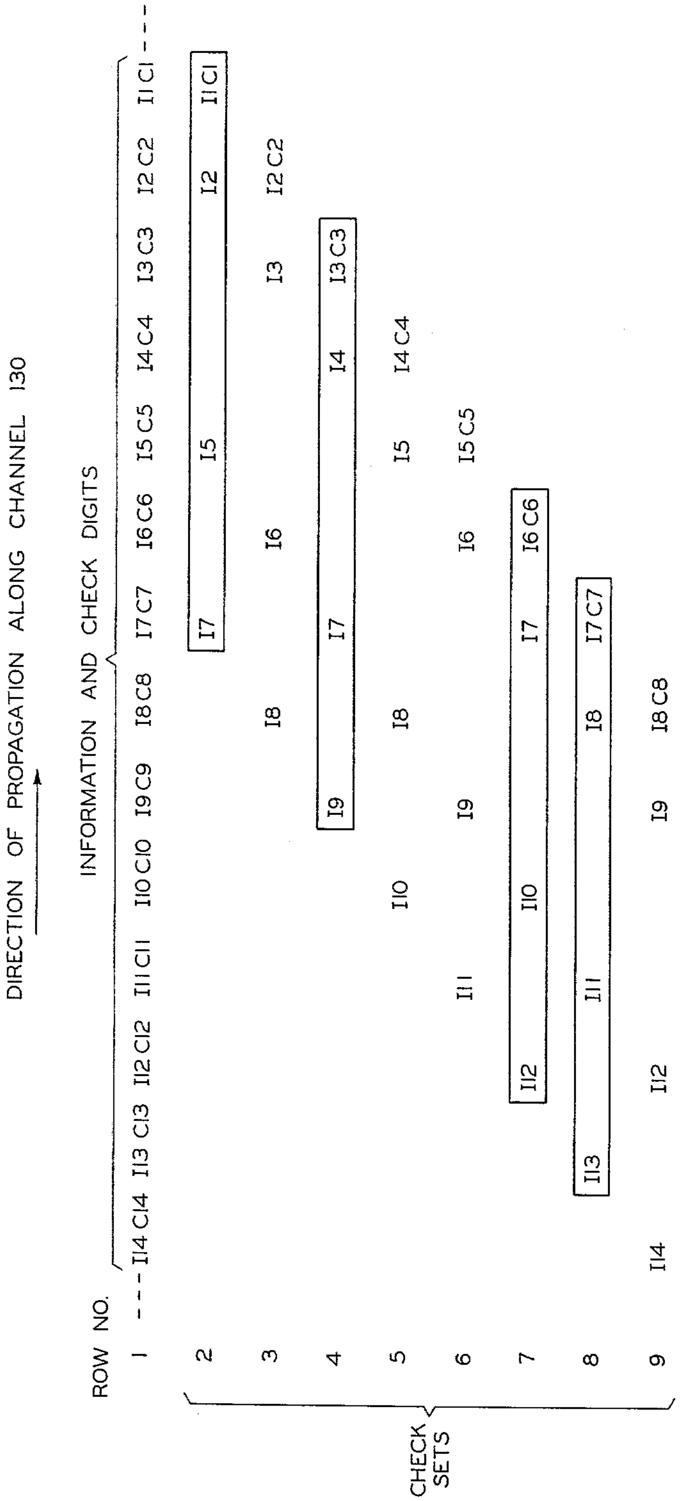
FIG. 2 illustrates a portion of the digital signals which appear on the channel of the FIG. 1 system during one particular interval of time and further indicates the parity relationships or check sets according to which certain ones of the signals are formed.

Row No.1 of FIG. 2 represents a snapshot of the alternating or interleaved information and check digits which are propagated along the channel 130. In FIG. 2 the label C1, for example, designates the first check digit that is transferred to the channel via the switch 117, while the label I1 represents the first information digit that is so transferred. Advantageously, the information and check digits are coupled to the channel 130 during successive equally-spaced intervals. However, to emphasize the interleaved nature of the digits and to indicate that the encoded message is characterized illustratively by a redundancy of one-half, each information digit is depicted in FIG. 2 as occurring closer in time to the previously transferred check digit than to the subsequently transferred one. Thus, for example, I1 and C1 are shown in row No. 1 of FIG. 2 as a pair of signals spaced from I2 and C2.

Check digit C1 is generated by the parity circuit 116 at the time that information digits I1, I2, I5, and I7 are in stages 109, 108, 105, and 103, respectively, of the shift register 110. The digits C1, I1, I2, I5, and I7 are shown in row No. 2 of FIG. 2 and are referred to herein as constituting a check set. Check digit C2 is generated during a later period of time and is derived from the information digits that occupy stages 109, 108, 105, and 103 during that period. Specifically, the information digits I2, I3, I6, and I8 occupy the noted stages during that time. Hence, the digits C2, I2, I3, I6, and I8 form another check set as represented in row No. 3 of FIG. 2. In a similar repetitive manner, check digits C3 through C8 are derived from the respective check sets shown in rows 4 through 9 of FIG. 2.

Other check digits are automatically formed by the encoder 100 shown in FIG. 1 as information signals are continuously applied in a serial mode to the register 110 from the source 102. In this way other check digits not actually represented in FIG. 2 are formed. For example, check digit C9 would be derived from the check set which includes C9, I9, I10, I13, and I15. In general each check digit formed by the illustrative encoder of FIG. 1 is derived from four information digits, specifically from those in stages 103, 105, 108, and 109 at the time of generation of the check digit.

As the specific illustrative encoder shown in FIG. 1 continues to generate check digits and to interleave them on the channel 130 with information digits supplied by the source 102, it is evident that each information digit is a member of or is common to four different check sets.

Information digit I7, for example, enters into the determination of check digit C1 when I7 is stored in stage 103 of the register 110. Later I7 enters into the determination of C3 when I7 is stored in stage 105. Still later I7 enters into the formation of C6 when I7 is stored in stage 108. Similarly I7 enters into the formation of C7 when I7 is present in stage 109. The four check sets each of which contains I7 are shown enclosed in rectangular boxes in rows 2, 4, 7, and 8 of FIG. 2. These four check sets possess the property of independence. In other words, no digit other than the common digit I7 is common to two or more of these check sets.

At the decoder of the illustrative system shown in FIG. 1 the redundant information message is processed to determine whether the information digit common to each group of independent check sets is correct or not. The indications available for this determination are the value of the common digit itself and the respective values obtained by solving the check sets which include the common digit. In accordance with the principles of the present invention the value of the common digit is reversed by the decoding circuitry if more than half of the check sets indicate an incorrect parity relationship. If, on the other hand, half or less of the check sets indicate an incorrect parity relationship, the value of the common digit is left undisturbed. In this manner the specific decoder shown in FIG. 1 automatically corrects a maximum of any $S/2$ errors in the digits included in each group of independent check sets, where S is any even positive integer greater than two and represents the number of information digits included in each check set. Since S is an even positive integer greater than two, it is noted that systems made in accordance with the principles of this invention are applicable to the correction of multiple errors. In the specific case considered herein S equals 4; hence the specific case is directed to the correction of a maximum of two errors. Also it is noted that the encoding shift register included in the specific illustrative embodiment of the principles of this invention shown in FIG. 1 comprises $$\frac{S^2-S}{2}+1$$

stages. More generally, an encoding shift register made in accordance with the principles of this invention includes at least $$\frac{S^2-S}{2}+1$$

stages.

From the above discussion it is evident that one basic concept to be observed in constructing codes in accordance with the principles of the present invention is to make each group of check sets which includes a common information digit independent in nature. If this basic concept is embodied in an information processing system, then the system can be made self-correcting within certain specified error capabilities. In this way the probability of an error occurring in such systems can be significantly reduced.

The check sets shown in FIG. 2 possess the property of independence. The further description contained immediately hereinbelow is directed to establishing general principles underlying the formation of the particular check sets shown in FIG. 2. In accordance with those principles other independent check sets may easily be formed. In turn, once the check set structure is established, the connections in the encoder between the party check digit generating circuit and the information digit shift register are specified.

FIG. 3A is simply a representation in tabular form of the boxed-in independent check sets shown in FIG. 2. It is convenient to rearrange FIG. 3A by omitting the check digits therefrom and representing the information digits thereof in terms of the differences of the informations digits from I7, letting I7−I5=S1, I5−I2=S2, and I2−I1=S3. The resulting rearrangement is illustrated in FIG. 3B and is characterized by the fact that each digit other than I7 is represented by a distinct difference designation. More generally, it has been established that a necessary and sufficient condition for independence of a group of check sets is that the differences and all possible sums of consecutive differences be distinct.

For the specific group of check sets considered herein S1=I7−I5=2, S2=I5−I2=3, and S3=I2−I1=1. Therefore, the consecutive sums of the differences are S1+S2=5, S2+S3=4, and S1+S2+S3=6. By disregarding I7 itself and placing in the appropriate rectangle the numeric representation of the difference between I7 and the information digit which occupies the corresponding rectangle in FIG. 3A, the arrangement of FIG. 3B can be converted to that of FIG. 3C. It is noted that the differences contained in the upper right portion of FIG. 3C are to be subtracted from I7 to obtain the respective information digits and that, on the other hand, the differences contained in the lower left portion of FIG. 3C are to be added to I7 to obtain the respective information digits. Thus, for example, the numeral 6 in the upper right hand rectangle of FIG. 3C indicates that the information digit which occupies the corresponding position in FIG. 3A is 6 digit positions removed from and lower than I7. I1 is 6 positions lower than I7 and it is seen that I1 does in fact occupy the same position in FIG. 3A that is occupied by the numeral 6 in the upper right hand portion of FIG. 3C. Similarly the numeral 6 in the lower left hand rectangle of FIG. 3C indicates that the information digit which occupies the corresponding position in FIG. 3A is 6 digit positions higher than I7. I13 is 6 digit positions higher than I7 and the designation I13 does in fact occupy the lower left hand corner rectangle of FIG. 3A. In an identical manner each of the distinct numerals of FIG. 3C can be shown to be representative of the correspondingly-positioned information digit shown in FIG. 3A. Hence it is possible to directly convert a distinct numeric representation such as that shown in FIG. 3C to a representation of a group of independent check sets. For illustrative purposes this type of direct conversion will be demonstrated later hereinbelow in connection with the description of FIGS. 5A and 5B.

It is significant to note the pattern according to which the triangular array of distinct numerals in each portion of FIG. 3C is arranged. Each of the numerals 2, 3, and 1 along the diagonal of the array is representative of one of the differences S1, S2, and S3. Each of the numerals 5 and 4 is representative of the sum of adjacent pairs of the diagonal differences. Thus, 5 is the sum of 2 and 3 and therefore is representative of S1+S2. Similarly 4 is the sum of 3 and 1 and therefore is representative of S2+S3. Lastly, the numeral 6 is representative of the sum of all the numbers disposed along the diagonal of the triangular array. Thus 6 is the sum of 2, 3, and 1 and therefore is representative of S1+S2+S3. The arrows in FIG. 3C are intended to indicate from which numbers each sum thereof is derived.

It is desirable that the digits included in a group of independent check sets be packed together as closely as possible, thereby to minimize the number of shift register stages needed in the encoding and decoding circuitry of the system shown in FIG. 1. In the specific example represented in FIG. 2 the group of check sets which includes I7 as the common digit thereof contains every information digit from I1 through I13. Therefore the digits included in the group are as closely packed as is possible. It is noted that the number in the lower left hand (or upper right hand) rectangle of a pattern of the type of that shown in FIG. 3C is indicative of the packing of the check set represented thereby. The smaller this number the better the packing.

With respect to FIG. 3C it is further noted that if a check set includes S information digits, there will be S−1 numerals along the diagonal of the triangular arry representative thereof and, in addition, there will be a total of (S−1)+(S−2)+ . . . 1=(½)S(S−1) numbers in the triangular array. Since these numbers must all be different, the minimum value for the largest one is (½)S(S−1). The largest number is this minimum value only if the code is closed packed and the triangular array uses all the integers from 1 through (½)S(S−1). It should be noted that the minimum value is in fact a lower bound which is not realized when S is greater than four.

One way to form a code of the type required for constructing an automatic correction system made in accordance with the principles of the present invention is to use powers of 2 for the difference representations, as indicated in FIG. 4 wherein the numbers 1, 2, 4, 8 and 16 form the diagonal of the triangular array shown there. Each of the numbers 3, 6, 12, and 24 in FIG. 4 represents the sum of adjacent pairs of differences, specifically the sum of the two differences from which arrows extend. Additionally, each of the numbers 7, 14, and 28 represents the sum of three consecutive differences, specifically the three from which arrows extend. Further, the number 15 is derived by adding the differences 1, 2, 4, and 8 and the number 30 is derived by adding the differences 2, 4, 8, and 16. Similarly, the number in the lower left hand corner is obtained by adding together all the differences contained in the diagonal.

Another method for forming a numeric representation of the type required for implementing the principles of the present invention is to use a so-called sieve approach. In this approach the integers are arranged in ascending order and the sums of consecutive remaining numbers are then deleted. For example, since 2+1=3, the number 3 is deleted from the sequence 1, 2, ~~3~~, 4, 5, . . . Similarly, since 4+2=6 and 4+2+1=7, the sequence is further modified to the form 1, 2, ~~3~~, 4, 5, ~~6~~, ~~7~~, 8, 9, . . . Further, since 5+4=9, 5+4+2=11 and $$5+4+2+1=12$$

the sequence is again modified to 1, 2, ~~3~~, 4, 5, ~~6~~, ~~7~~, 8, ~~9~~, 10, ~~11~~, ~~12~~, 13, 14 . . . In continuing to carry out this process it occasionally occurs that a sum is obtained which leads one to try to strike out a number which had been already deleted. In such a case the procedure to follow is to delete the largest number used in forming the sum. When this procedure is followed the following series results: 1, 2, 4, 5, 8, 10, 14, 21, 25, 26, 28, 31, 36, 38 . . .

Taking the first five numbers of this series as constituting the diagonal of a triangular array and thereafter deriving the other numbers of the array in the manner illustrated above in connection with FIGS. 3C and 4, the pattern depicted in FIG. 5A results. It is noted that the numeral 20 in the lower left hand corner of FIG. 5A specifies that the array is characterized by considerably better packing than is characteristic of the FIG. 4 array wherein the numeral 31 is positioned in the lower left hand corner thereof.

The array of FIG. 5A bears the same relationship to the pattern of FIG. 5B as do FIGS. 3C and 3A to each other. In accordance with the principles set forth herein it is a straightforward matter to fill in the rectangles of the FIG. 5B table in the specific manner shown. From FIG. 5B an alternating encoder of the general type shown in FIG. 1 may be constructed. In such an alternating encoder S=6. Accordingly, a system which includes such an encoder would be capable of correcting a maximum of (½)S or 3 errors in the $S^2+1=37$ digits included in each group of independent check sets. The parity check digit generating circuit of such an encoder would obtain its inputs from stages 1, 9, 14, 18, 20, and 21 of a 21-stage encoding shift register.

For relatively small triangular arrays of the general type shown in FIGS. 3C, 4 and 5A, it is possible to find the best possible arrays by systematically constructing patterns starting with the first S−1 integers. By this method it can, for example, be shown that for $S=6$ a close packed set is impossible and that the best arrays therefor include the number 17 in the lower left hand corner thereof rather than the optimum value 15. For relatively large arrays the best ones known can be obtained from difference sets of the type described in "A Summary of Difference Sets," M. Hall, Jr., Proceedings of the American Mathematical Society, 1956, pages 975–986.

Returning now to the specific illustrative error-correcting system shown in FIG. 1, it is recalled that therein S, the number of information digits from which each check digit is derived, equals 4. Further, the number of digits included in each group of independent check sets therein is $S^2+1$ or 17. Such a specific system can correct a maximum of (½)S or 2 errors in the 17 digits included in each group of independent check sets.

Information signals which are converted into redundant form by the specific illustrative encoder 100 shown in FIG. 1 are transferred to the channel 130 and propagated therealong to the decoder 150. At the decoder the received signals enter switch 151 wherein the alternating information and check digits are separated, the check digits being directed to the check digit shift register 153 and the information digits to the information digit shift register 154. The information and check digits are shifted through their respective registers in a stage-by-stage manner under control of signals from a shift source 155.

A parity checking circuit 157 in the decoder 150 determines the parity relationship that exists between the information digits stored in stages 1, 2, 5, and 7 of the register 154 and the check digit stored in stage No. 1 of the register 153. If this relationship is the opposite of that imposed among those digits in the encoder 100, a "1" signal is supplied by the circuit 157 to a syndrome shift register 160. More specifically, the circuit 157 initially calculates the parity relationship that exists among I1, I2, I5, I7, and C1 and applies an appropriate indication of the results of this recalculation to the register 160. In particular, the circuit 157 supplies a "0" signal as indicative of correct parity and a "1" signal for incorrect parity. Later the circuit 157 checks the parity of I3, I4, I7, I9, and C3. Still later the circuit 157 checks the parity of I6, I7, I10, I12, and C6. Finally, the parity of I7, I8, I11, I13, and C7 is recalculated.

At the time that the checking circuit 157 of the decoder 150 is recalculating the parity of the fourth check set comprising I7, I8, I11, I13, and C7, the results of the three previously-mentioned calculations are stored in stages 1, 3, and 6 of the syndrome shift register 160. Thus, when the result of recalculating the parity of the fourth check set is applied to the register 160 (and also to majority logic circuit 162) the circuit 162 has applied as inputs thereto the results obtained from recalculating the four parity relationships imposed at the encoder 100 and according to which the check digits C1, C3, C6, and C7 were formed. At this same time I7 is stored in stage No. 1 of the information digit shift register 154.

If a majority (i.e., 3 or 4) of the inputs to the logic circuit 162 are "1" signals each representative of an incorrect parity relationship, the circuit 162 supplies a "1" correction signal to circuit 165, which responds thereto by reversing the value of I7 as it is applied during the next shift interval to the output line 152. On the other hand, if only two or less of the inputs to the logic circuit 162 are "1" signals, the circuit 162 does not supply a "1" correction signal to the reversing circuit 165 and, accordingly, the value of I7 is then left undisturbed during the process of being transferred from the output stage of the register 154 to the line 152.

The basis for the determination by the majority logic circuit 162 of whether or not to apply a correction signal to the reversing circuit 165 is clear if various illustrative error possibilties are considered. Assume that the value of I7 was transformed during its propagation along the channel 130 and that no errors occurred in any of the other 17 digits making up the group of independent check sets of which I7 is the common digit. As a result of such a single error each of the four check sets recalculated by the parity checking circuit 157 would be determinated to be in error. Consequently four "1" signals would be applied to the majority logic circuit 162 and a reversal of I7 would occur, whereby a correct version of I7 would appear on the output line 152.

Assume further that I7 was transformed in value and that the value of I5 also was changed during the process of being transmitted to the decoder 150. It would, as a result, appear to the parity checking circuit 157 that the check set that includes I1, I2, I5, I7, and C1 was correct. However, each of the other three check sets recalculated by the circuit 157 would appear to be in error. This would result in a "1" signal being applied to the circuit 162 and the register 160 for each such recalculation. Hence, the circuit 162 would have applied thereto three "1" signals, which would again cause a reversal of the value of I7.

Execept for the reversing circuit 165 and the majority logic circuit 162, all of the various circuits shown in block diagram form in FIG. 1 are considered to be easily implementable by any one skilled in the art in view of the specific functional requirements therefor set forth herein. Illustratively, if one desires to implement these blocks with relay-type circuits, the encoding shift register 110, the parity check digit generating circuit 116, the switches 117 and 151, the registers 153 and 154, and the parity checking circuit 157 may be constructed in general accordance with the detailed circuit descriptions contained in my aforecited Patent 2,956,124. The sources 101, 102, 115, 155, and 170 may be selected from a variety of available signal generating circuits and are considered to be completely straightforward.

In addition, it is noted that in the implementation of the error-correcting system shown in FIG. 1 various synchronization signals should advantageously be made available therein. In the actual illustrative embodiment depicted in FIG. 1 it has been assumed that synchronization signals are available in both the encoder and the decoder. To avoid the use of a separate channel for propagating synchronization signals between the encoder and decoder, conventional synchronization signal recovery circuitry may, for example, be employed at the decoder.

Figure 6:
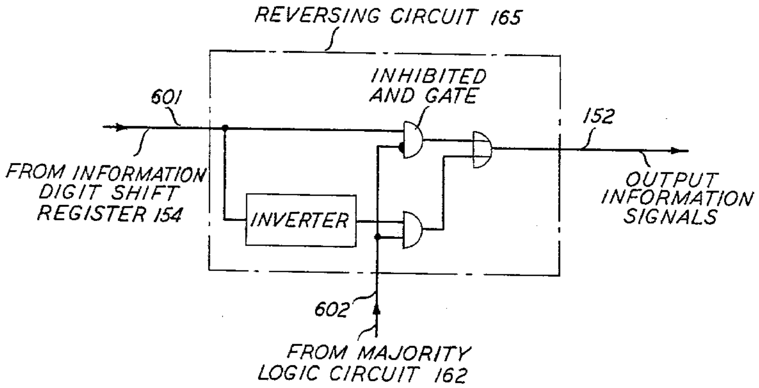
FIG. 6 illustrates one specific form which the reversing circuit included in the FIG. 1 system may take.

The reversing circuit 165 is shown in detail in FIG. 6. An input binary signal applied to input lead 601 of the circuit 165 is propagated therethrough and appears on the lead 152 unless a "1" signal is applied to input lead 602. In the latter case the input binary signal applied to the lead 601 is transformed to the other binary value before being applied to the lead 152.

Figure 7:
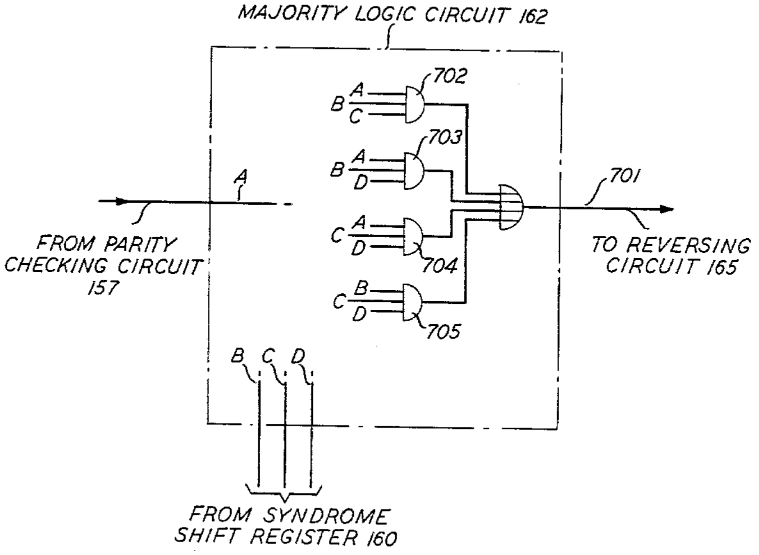
FIG. 7 shows one specific form which the majority logic circuit included in the FIG. 1 system may take.

The majority logic circuit 162 shown in detail in FIG. 7 provides a "1" output signal on lead 701 only if three or four "1" signals are simultaneously applied to the four input leads thereof. To simplify the representation of FIG. 7 the electrical connections which actually extend between the four input leads and the inputs to the AND circuits 702, 703, 704, and 705 have not been shown therein. It is to be understood, however, that an electrical connection actually extends between each input lead and the correspondingly-labeled AND circuit inputs.

A desirable characteristic of the codes embodied in systems made in accordance with the principles of the present invention is the ease with which may be calculated an upper bound on the probability of errors existing in the decoded information digits. For example, in order for the specific illustrative FIG. 1 system to supply an erroneous digit to the output line 152 there must have been at least three errors in the 17 digits defining a particular group of independent check sets. If the probability of a digit being in error is $p$, then the probability of three or more errors in the 17 digits is $$P=(3^{17})p^3(1-p)^{14}+(4^{17})p^4(1-p)^{13}+\dots$$

This is an upper bound because not all patterns of three-digit errors cause the signals applied to the line 152 to be incorrect. In the particular example assumed above P is about 2½ times the actual probability that errors will occur in signals applied to the line 152.

As noted above, a code with S information digits in each check set thereof has $S^2+1$ digits in each group of independent check sets. An embodiment of such a code can correct and $S/2$ digit errors in each group. Hence, the general expression for P becomes $$P=\binom{S^2+1}{\frac{S}{2}+1}p^{\left(\frac{S}{2}\right)+1}(1-p)^{S^2-\frac{S}{2}}+\binom{S^2+1}{\left(\frac{S}{2}\right)+2}p^{\left(\frac{S}{2}\right)+2}(1-p)^{S^2-\left(\frac{S}{2}\right)-1}+\dots$$

Figure 8:
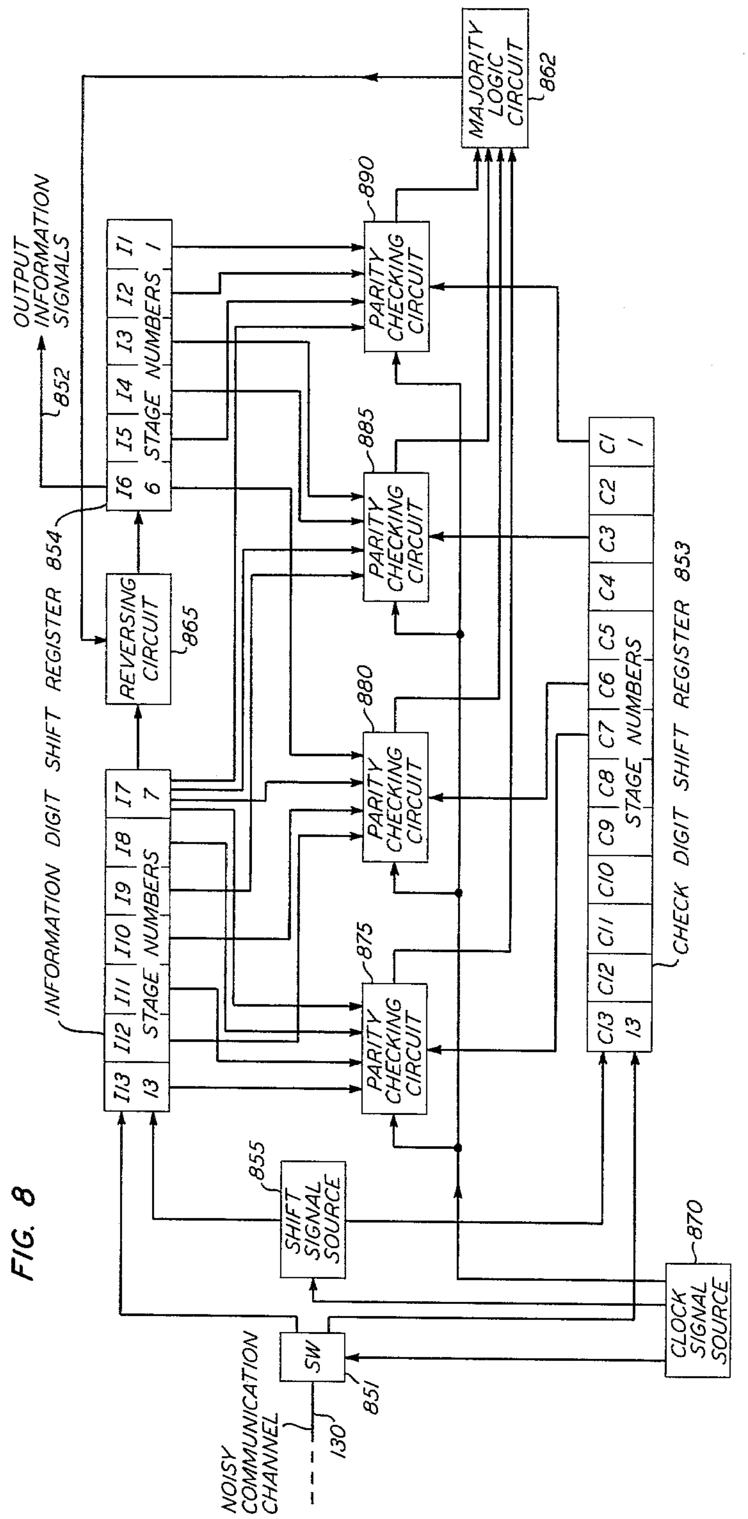
FIG. 8 depicts a modification of the decoder portion of the system shown in FIG. 1.

FIG. 8 decoder includes an information digit shift register cific illustrative decoder 150 depicted in FIG. 1. The FIG. 8 decoder includes an information digit shift register 854 having a reversing circuit 865 interposed between stages 6 and 7 thereof. The modification also includes a check digit shift register 853, four parity checking circuits 875, 880, 885, and 890 and a majority logic circuit 862. The circuits included in the modified decoder are controlled by signals supplied by a clock signal source 870 and a shift signal source 855. It is noted that the designations included in the various stages of the shift registers 853 and 854 indicate the information and check digits which are stored in the respective stages thereof during the time in which the independent check sets which include the common information digit I7 are being recalculated.

It is significant that the FIG. 8 decoder includes four parity checking circuits rather than only one as shown in FIG. 1. The first parity checking circuit 875 recalculates the parity relationship that exists among I7, I8, I11, I13, and C7. The second circuit 880 recalculates the parity relationship that exists among I6, I7, I10, I12, and C6. The third circuit 885 recalculates the parity among I3, I4, I7, I9, and C3, and, lastly the circuit 890 recalculates the parity among I1, I2, I5, I7, and C1. Subsequently, the circuits 875, 880, 885, and 890 respond to a clock signal from the source 870 by supplying four simultaneous signals each indicative of either a correct or an incorrect parity recalculation to the majority logic circuit 862. In turn, the circuit 862 applies a correction signal to the circuit 865 if two or more of the inputs to the circuit 862 are "1" signals indicative of incorrect parity recalculations.

The advantage of the FIG. 8 decoder is that some of the digital signals which are applied to the four parity checking circuits thereof were corrected earlier during a previous portion of the cycle of operation of the illustrated decoder. For example, it is noted that three of the five inputs to the parity checking circuit 890 are derived from information digit shift register stages located to the right of the reversing circuit 865. In other words, those three stages of the register 854 contain therein signals which were corrected (or determined not to need correction) earlier in the cycle of operation of the decoder. By following this novel recalculation approach, wherein some of the signals from which the parity relationships are recalculated are known to be correct, the probability of errors occurring on output line 852 is even further reduced compared to the relatively low probability characteristic of the specific decoder 150 shown in FIG. 1.

Figure 9:
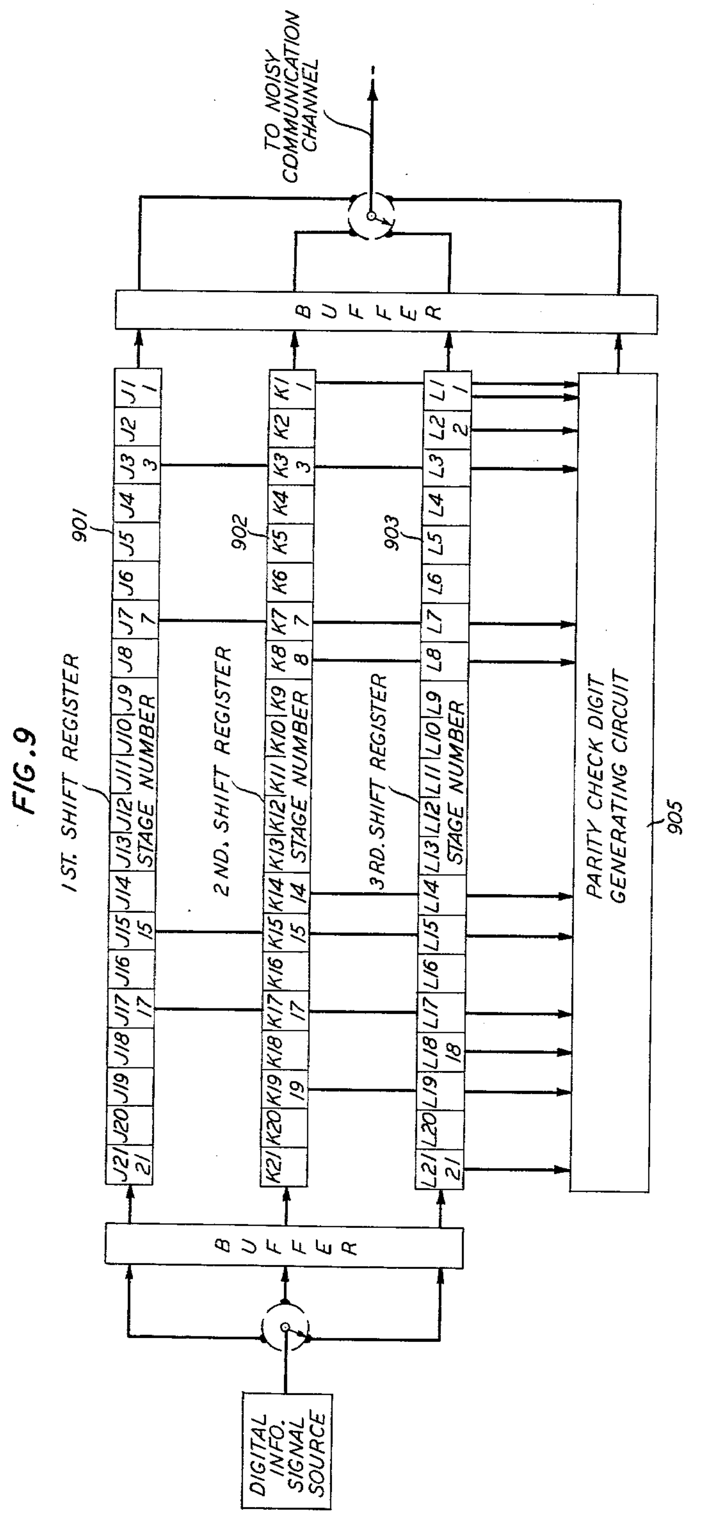
FIG. 9 illustrates another specific encoder made in accordance with the principles of the present invention.

Although emphasis herein has been directed to an automatic correction system characterized by a redundancy of one-half, it is to be understood that the principles of the present invention are not limited thereto. Thus, for example, FIG. 9 depicts another specific encoder made in accordance with the principles of this invention, which is characterized by a redundancy of one-quarter. That is, a check digit signal is transferred from the encoder to the noisy channel, then three information digit signals are transferred thereto, then a check signal, then three information signals, and so forth. The FIG. 9 encoder is similar in over-all arrangement to the encoder shown in FIG. 7 of my aforecited Patent 2,956,-124. The essential difference between the two encoders is that the electrical connections which extend between the three encoding shift registers 901, 902, and 903 in FIG. 9 and the parity check digit generating circuit 905 thereof are different than those shown between the corresponding circuits in FIG. 7 of the patent. This difference is reflective of the novel principles embodied in the FIG. 9 encoder. As a result of these novel principles the structurally distinct FIG. 9 encoder possesses unique properties that make it suitable for inclusion in a system designed to automatically correct independently-occurring errors.

Assume that the specific illustrative encoder shown in FIG. 9 is designed to be included in a system in which S=4, wherein S equals the number of stages in each of the encoding shift registers 901, 902, and 903 from which information digits are derived for generating an associated check digit. Such a system is capable of correcting a maximum of any S/2 errors in the digits included in a group of independent check sets that includes $3S^2+1$ information and check digits.

To facilitate an understanding of the operation of the illustrative encoder shown in FIG. 9, each stage of the first shift register 901 is depicted as including therein an information digit having a J designation. Thus, for example, stage No. 1 of the register 901 has stored therein information digit J1 during one particular portion of the cycle of operation of the encoder, and stage No. 21 has J21 stored therein during that portion. Similarly, the registers 902 and 903 are depicted as storing therein information digits having K and L designations, respectively.

It is evident from a consideration of FIG. 9 that the information digit J21 stored in the shift register 901 enters into the determination of the check digit when J21 is contained in stage No. 17 of the register 901. Also J21 enters into the determination of a second check digit when J21 is present in stage No. 15 of the register 901. Similarly, J21 enters into the determination of two other check digits, specifically those which are generated when J21 is stored in stages 7 and 3 of the register 901. Each of these four mentioned check digits is determined not only by J21 but also by 11 other selected information digits, three others in the register 901 and four from each of the registers 902 and 903. In particular, rows 1, 2, 3, and 4 of FIG. 11 show the information digits which enter into the determination of check digits C5, C7, C15, and C19. Thus, for example C5, is generated by the circuit 905 of FIG. 9 to establish even parity among itself, and information digits L5, L6, L22, L25, K5, K12, K18 K23, J7, J11, J19, and J21 these noted digits constituting a check set.

The 3S or 12 check sets shown in FIG. 11 are characterized by comprising three groups of indpendent check sets. One group is shown in rows 1 through 4, each check set thereof including the common information digit J21. No other information digit is common to two or more of these four check sets. Hence, the check sets of this first group are seen to be independent in nature. Similarly, the group of check sets in rows 5 through 8, and in addition, the group in rows 9 through 12, are each independent. It is noted that the sole common digit in the check sets in rows 5 through 8 is the information digit K21 and that the sole common digit in the check sets in rows 9 through 12 is the information digit L21.

The array depicted in FIG. 11 can be constructed from the distinct numeric representations shown in FIGS. 12A, 12B, and 12C. This construction is straightforward in view of the detailed description contained hereinbelow. In particular, it is noted that the J digits in rows 1 through 4 are derived from FIG. 12A in exactly the same manner that FIG. 3A is derived from FIG. 3C. Also the K digits in rows 5 through 8 are derived from FIG. 12B in that same manner, and the L digits in rows 9 through 12 are derived directly from FIG. 12C in a similar fashion. It has been established that a necessary and sufficient condition for independence of each of the groups of check sets included in FIG. 11 is that the differences and all possible sums of consecutive differences thereof be distinct.

Hence, FIG. 11 specifies the connections between the registers 901, 902, 903, and the check digit generating circuit 905. Row No. 9 of FIG. 11 indicates the information digits from which C1 is derived. In other words, row No. 9 specifies that C1 is derived from L1, L2, L18, L21, K1, K8, K14, K19, J3, J7, J15, and J17. These information digits are shown in FIG. 9 as being applied to the parity circuit 905, thereby to generate the first check digit C1.

Figure 10:
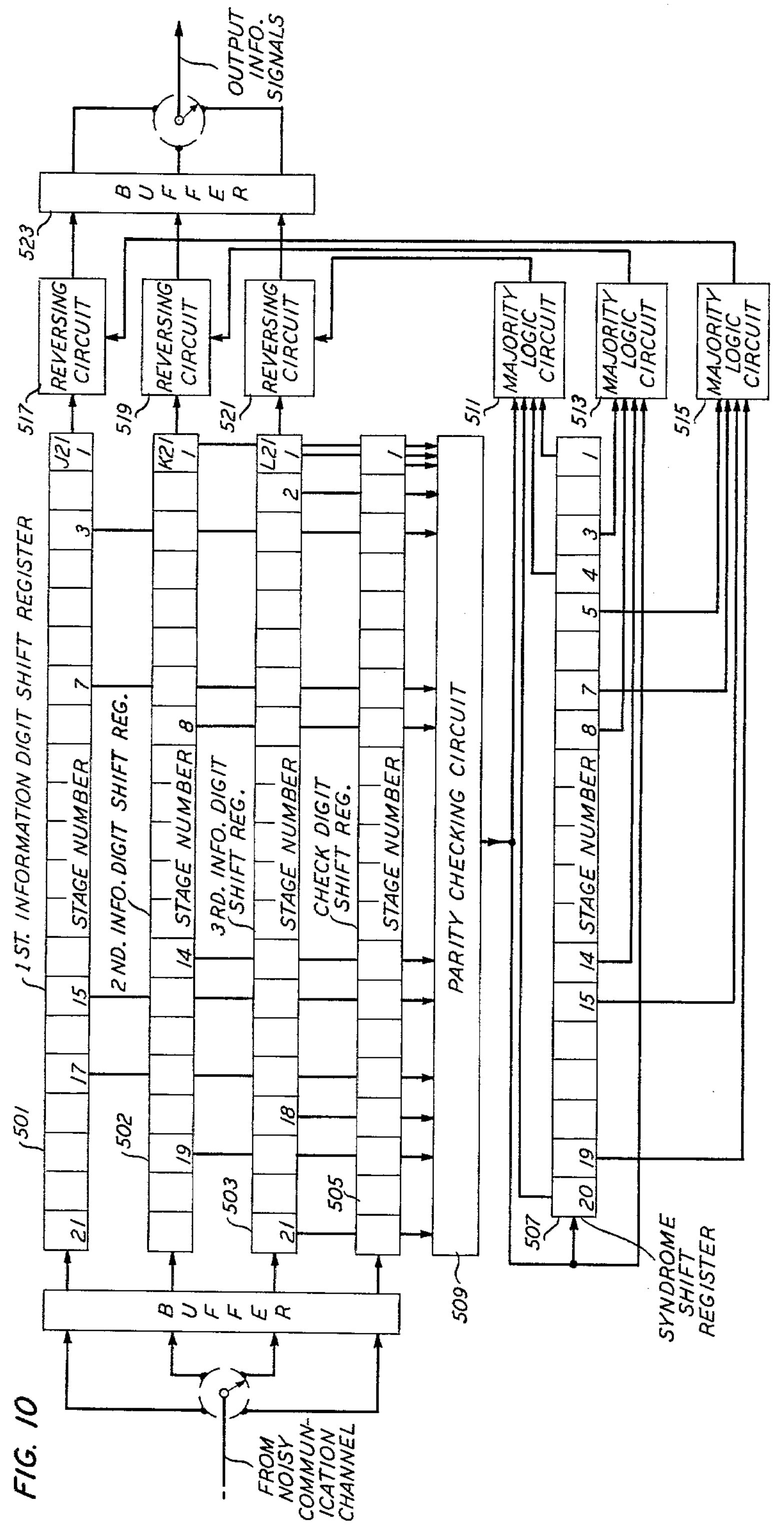
FIG. 10 shows an illustrative decoder of the type that may be combined with the FIG. 9 encoder to form an error-correcting system that embodies the principles of this invention.

The decoder shown in FIG. 10 is similar in over-all arrangement to the decoder illustrated in FIG. 9 of my aforecited patent. One significant structural difference therebetween is the interconnection pattern between the three information digit shift registers and the check digit shift register and the parity checking circuit. In FIG. 10 the connections therebetween conform to those specified above in connection with the description of the FIG. 9 encoder. Thus, for example, the digits C21, L21, L22, L38, L41, K21, K28, K34, K39, J23, J27, J35, and J37 are shown in FIG. 10 being applied to the parity checking circuit 509. A signal indicative of this parity recalculation is subsequently applied to majority logic circuit 511 which also has applied thereto signals representative of the recalculations of the respective check sets that include C1, C4, and C20. If a majority (i.e., 3 or 4) of these signals indicate incorrect parity, then the circuit 511 applies a correction signal to its associated reversing circuit 521 which in turn reverses the value of L21 as it is transferred from stage No. 1 of the register 503 to buffer 523. If, on the other hand, only half or less of the check sets are recalculated by the circuit 509 to have been in error, the majority logic circuit 511 does not then apply a correction signal to the reversing circuit 521, whereby the value of L21 is not changed as it is transferred to the buffer 523.

In a manner similar to that described above, majority logic circuit 513 applies a correction signal to reversing circuit 519 if more than half of the check sets that include C3, C8, C14, and C21 are determined to be in error. In addition, majority logic circuit 515 applies a correction signal to reversing circuit 517 if more than half of the check sets that include C5, C7, C15, and C19 are recalculated by the circuit 509 to be in error.

It is noted that the specific illustrative decoder shown in FIG. 10 may be easily modified to form a decoder of the general type depicted in FIG. 8. In such a modification of FIG. 10, there are 12 parity checking circuits each of which receives as respective inputs thereto the check and information digits listed in each row of FIG. 11.

It is to be understood that the above-described arrangements are only illustrative of the application of the principles of the present invention. Numerous other arrangements may be devised by those skilled in the art without departing from the spirit and scope of the invention. For example, although emphasis herein has been directed to a specific system in which an even parity relationship is embodied, it is, of course, clear that an odd parity relationship may also be incorporated therein.

What is claimed is:

1. In combination in an error-correcting system, multistage encoding shift register means for storing information signals, and parity check digit generating means connected to S selected ones of said stages for forming parity check signals each of which that is derived from a common information digit is a member of a group of independent check sets, where S is an even positive integer greater than two.

2. A combination as in claim 1 further including means for applying information signals to said register means.

3. A combination as in claim 2 further including means for shifting said information signals through said register means in a stage-by-stage manner.

4. A combination as in claim 3 still further including a communication channel, and means responsive to output signals from said register means and said generating means for interleaving said signals and applying them to said channel.

5. In combination in an error-correcting system, encoding shift register means including $$\frac{S^2-S}{2}+1$$

stages for storing information signals, where S is any positive even integer greater than two, and parity check digit generating means connected to S of said stages for forming check digits each of which that is derived from a common information digit is a member of a group of S independent check sets.

6. A combination as in claim 5 further including means for applying information signals to said register means.

7. A combination as in claim 6 further including means for shifting said information signals through said register means in a stage-by-stage manner.

8. A combination as in claim 7 still further including a communication channel, and means responsive to output signals from said register means and said generating means for interleaving said signals and applying them to said channel.

9. In combination in an error-correcting system, an encoding shift register comprising seven interconnected stages each including an output terminal, said stages including an input stage and an output stage and being designated 1 through 7 in order starting with said output stage, a parity check digit generating circuit connected to the output terminals of said first, second, fifth, and seventh stages, a digital information source for applying signals to said input stage, a shift signal source for advancing signals applied to said register therethrough in a stage-by-stage manner, a communication channel, and a switch responsive to information signals from said output stage and check signals from said parity generating circuit for interleaving said information and check digits and applying them to said channel.

10. In combination in a decoder to which interleaved information and check digit signals are applied from a noisy communication channel, each check signal being a member of a group of S independent check sets each of which includes a check signal and S information signals, where S is an even positive integer greater than 2, multistage information digit shift register means, multistage check digit shift register means, switching means connected to said channel for applying said information signals to said information digit shift register means and said check signals to said check digit shift register means, and S parity checking circuits each connected to a different stage of said check digit shift register means and to S different stages of said information digit shift register means, only one of the stages included in said information digit shift register means being connected to more than one of said parity checking circuits.

11. In combination in an error-correcting system, a multistage information digit shift register, a multistage check digit shift register, a switch responsive to interleaved information and check digits received from a noisy communication channel for applying the information digits to said information shift register and the check digits to said check shift register, each check digit being a member of a group of independent check sets, a parity checking circuit responsive to signals stored in S selected stages of said information digit register and to the signals stored in a selected stage of said check digit register for recalculating the parity relationship according to which each check digit signal was formed and for providing one type of binary signal if the parity relationship among said selected stored signals is correct and for providing the other type of binary signal if said parity relationship is incorrect, where S is an even positive integer greater than two, a multistage syndrome shift register responsive to the output of said parity checking circuit for storing signals received therefrom, a majority logic circuit responsive to the output of said parity checking circuit and to the signals stored in selected stages of said syndrome shift register for providing a correction binary signal if more than one half of the signal inputs thereto are indicative of incorrect parity relationships, and a reversing circuit responsive to a correction signal from said majority logic circuit for changing the binary value of the output of said information digit shift register.

12. In combination in an error-correcting system, an encoder comprising multistage shift register means for storing information signals, parity check digit generating means connected to S selected ones of said stages for forming parity check signals each of which that is derived from a common information digit is a member of a group of independent check sets, where S is an even positive integer greater than two, a communication channel, and means connected to the output of said shift register means and said parity generating means for interleaving said information and check signals and applying them to one end of said channel; and a decoder connected to the other end of said channel, said decoder comprising means responsive to said interleaved information and check signals for recalculating the parity relationship according to which each check signal was formed, and means responsive to signals representative of said recalculations for changing the information digit common to each group of independent check sets if more than half the check sets of the group are determined to have incorrect parity.

References Cited by the Examiner

UNITED STATES PATENTS

| | | | |
|---|---|---|---|
| 2,956,124 | 10/1960 | Hagelbarger ---- | 340—146.1 X |
| 3,069,657 | 12/1962 | Green et al. ----- | 340—146.1 X |

ROBERT C. BAILEY, *Primary Examiner.*

MALCOLM A. MORRISON, *Examiner.*